(12) United States Patent
Ju et al.

(10) Patent No.: US 11,635,565 B2
(45) Date of Patent: Apr. 25, 2023

(54) LAMP, HANGING TRANSPARENT LAMP AND LAMP SYSTEM

(71) Applicants: Radiant Opto-Electronics (Suzhou) Co., Ltd., Jiangsu (CN); Radiant Opto-Electronics Corporation, Kaohsiung (TW)

(72) Inventors: Chih-Hung Ju, Kaohsiung (TW); Guo-Hao Huang, Kaohsiung (TW)

(73) Assignees: RADIANT OPTO-ELECTRON ICS (SUZHOU) CO., LTD., Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/227,368

(22) Filed: Apr. 11, 2021

(65) Prior Publication Data

US 2021/0231862 A1 Jul. 29, 2021

Related U.S. Application Data

(63) Continuation of application No. PCT/CN2018/110071, filed on Oct. 12, 2018.

(51) Int. Cl.
| | |
|---|---|
| *F21V 8/00* | (2006.01) |
| *F21S 8/06* | (2006.01) |
| *F21S 2/00* | (2016.01) |
| *F21V 23/06* | (2006.01) |
| *F21Y 115/10* | (2016.01) |

(52) U.S. Cl.
CPC .......... *G02B 6/0095* (2013.01); *F21S 2/005* (2013.01); *F21S 8/061* (2013.01); *F21V 23/06* (2013.01); *G02B 6/0078* (2013.01); *G02B 6/0088* (2013.01); *F21Y 2115/10* (2016.08)

(58) Field of Classification Search
CPC .................................................. G02B 6/0095
See application file for complete search history.

(56) References Cited

U.S. PATENT DOCUMENTS

| | | |
|---|---|---|
| 5,282,600 A | 2/1994 | Weiss et al. |
| 6,135,615 A | 10/2000 | Lee |
| | (Continued) | |

FOREIGN PATENT DOCUMENTS

| | | |
|---|---|---|
| CN | 101900270 A | 12/2010 |
| CN | 101495801 B | 3/2011 |
| | (Continued) | |

*Primary Examiner* — Matthew J. Peerce
(74) *Attorney, Agent, or Firm* — CKC & Partners Co., LLC (57) ABSTRACT

A lamp, a hanging transparent lamp and a lamp system are provided. The lamp includes a frame body, a light guide plate, a light source and a circuit assembly. The frame body includes side covers, side bars, a first integrating member and a second integrating member. Each of the side covers comprises a carrying portion. Each of the two side covers is partitioned into an upper space and a lower space by the side bar. The light guide plate is held on the carrying portions. The light guide plate has a first light-emitting surface and a second light-emitting surface. Only side edge portions of the first light-emitting surface and the second light-emitting surface are covered by the frame body. The light source is disposed adjacent to the side surface of the light guide plate. The circuit assembly is connected to the light source to form an electrical loop.

13 Claims, 10 Drawing Sheets

(56) References Cited

U.S. PATENT DOCUMENTS

| | | | |
|---|---|---|---|
| 6,945,668 B1 | 9/2005 | Orlov et al. | |
| 8,104,920 B2 | 1/2012 | Dubord | |
| 8,740,437 B2* | 6/2014 | Kim | F21V 5/10 |
| | | | 362/633 |
| 9,664,365 B2 | 5/2017 | Myers et al. | |
| 10,126,486 B2* | 11/2018 | Ju | G02B 6/009 |
| 10,247,373 B1 | 4/2019 | Ladewig et al. | |
| 10,725,231 B2* | 7/2020 | Ross | F21V 23/002 |
| 10,935,308 B2* | 3/2021 | Fei | F25D 27/005 |
| 10,962,201 B2* | 3/2021 | Hetrick | G02B 6/005 |
| 2002/0118537 A1 | 8/2002 | Segretto | |
| 2004/0114361 A1 | 6/2004 | Severtson et al. | |
| 2009/0296381 A1 | 12/2009 | Dubord | |
| 2011/0205758 A1 | 8/2011 | Kim et al. | |
| 2012/0018212 A1 | 1/2012 | Wu et al. | |
| 2012/0099318 A1 | 4/2012 | Liu | |
| 2012/0257383 A1 | 10/2012 | Zhang | |
| 2013/0044512 A1 | 2/2013 | Araki et al. | |
| 2014/0160747 A1* | 6/2014 | Jang | F21S 8/061 |
| | | | 362/235 |
| 2015/0338053 A1 | 11/2015 | Rector et al. | |
| 2017/0002990 A1 | 1/2017 | O'Brien et al. | |
| 2018/0039014 A1 | 2/2018 | Ju et al. | |
| 2021/0071832 A1 | 3/2021 | Gomez Martinez et al. | |
| 2021/0141149 A1* | 5/2021 | Nijkamp | G02B 6/0055 |
| 2021/0231862 A1 | 7/2021 | Ju et al. | |

FOREIGN PATENT DOCUMENTS

| | | |
|---|---|---|
| CN | 102252180 A | 11/2011 |
| CN | 202026101 U | 11/2011 |
| CN | 102410452 A | 4/2012 |
| CN | 102454904 A | 5/2012 |
| CN | 102454919 A | 5/2012 |
| CN | 202229096 U | 5/2012 |
| CN | 202253153 U | 5/2012 |
| CN | 202546529 U | 11/2012 |
| CN | 102913828 A | 2/2013 |
| CN | 203023987 U | 6/2013 |
| CN | 203223775 U | 10/2013 |
| CN | 203240328 U | 10/2013 |
| CN | 203454008 U | 2/2014 |
| CN | 203848139 U | 9/2014 |
| CN | 104329602 A | 2/2015 |
| CN | 104641166 A | 5/2015 |
| CN | 204403887 U | 6/2015 |
| CN | 204479882 U | 7/2015 |
| CN | 204534349 U | 8/2015 |
| CN | 104879687 A | 9/2015 |
| CN | 104879699 A | 9/2015 |
| CN | 105135285 A | 12/2015 |
| CN | 204901562 U | 12/2015 |
| CN | 204943211 U | 1/2016 |
| CN | 205079122 U | 3/2016 |
| CN | 105546486 A | 5/2016 |
| CN | 106104142 A | 11/2016 |
| CN | 205877948 U | 1/2017 |
| CN | 106537020 A | 3/2017 |
| CN | 106885186 A | 6/2017 |
| CN | 107062103 A | 8/2017 |
| CN | 206449530 U | 8/2017 |
| CN | 107191833 A | 9/2017 |
| CN | 107314327 A | 11/2017 |
| CN | 107388114 A | 11/2017 |
| CN | 107842720 A | 3/2018 |
| CN | 107842786 A | 3/2018 |
| CN | 107917373 A | 4/2018 |
| CN | 207555386 U | 6/2018 |
| CN | 108286687 A | 7/2018 |
| CN | 207569563 U | 7/2018 |
| CN | 207569629 U | 7/2018 |
| CN | 108386778 A | 8/2018 |
| CN | 108397730 A | 8/2018 |
| CN | 108518627 A | 9/2018 |
| DE | 20005623 U1 | 3/2001 |
| EP | 2431654 A2 | 3/2012 |
| EP | 2765354 A1 | 8/2014 |
| GB | 563224 A | 8/1944 |
| KR | 20000058761 A | 10/2000 |
| KR | 20110070406 A | 6/2011 |
| TW | 201433743 A | 9/2014 |
| TW | M508004 U | 9/2015 |
| TW | 201616042 A | 5/2016 |
| TW | 201721056 A | 6/2017 |
| TW | M558872 U | 4/2018 |
| WO | 2012158894 A2 | 11/2012 |
| WO | 2014135555 A1 | 9/2014 |
| WO | 2017003863 A1 | 1/2017 |
| WO | 2020073637 A1 | 4/2020 |

\* cited by examiner

LAMP, HANGING TRANSPARENT LAMP AND LAMP SYSTEM

RELATED APPLICATIONS

This application is a continuation application of International Application No. PCT/CN2018/110071 filed on Oct. 12, 2018, which is incorporated herein by reference.

BACKGROUND

Field of Invention

The present invention relates to an illuminating device. More particularly, the present invention relates to a lamp.

Description of Related Art

Lamps become more diversified to meet market requirements. One of conventional lamps is a hanging transparent lamp which can achieve better appearance and illumination.

However, most of hanging transparent lamps uses externally exposed wires to connect to a power supply. Such externally exposed wires not only have complicated assembling processes and high manufacturing cost, but also result in a messy visual effect in a space.

In particular, when multiple transparent lamps are need to be connected in series, because each of the transparent lamps has an outer frame, light-emitting surfaces of the lamps are not continuously connected, thus resulting in inconsistent and non-aesthetic appearance as well as occurring partial dark areas on the light-emitting surfaces.

SUMMARY

One object of the present invention is to provide a lamp which has a frame body, and the frame body is used to integrate a circuit assembly, a light source and a light guide plate, thereby completing the assembly of the lamp that has a simple structure and can be rapidly assembly.

According to the aforementioned object, a lamp is provided. The lamp includes a frame body, a light guide plate, at least one light source and a circuit assembly. The frame body includes two side covers, two side bars, a first integrating member and a second integrating member. The side covers are disposed opposite to each other, each of the side covers includes a carrying portion, a first end and a second end opposite to the first end. The side bars are respectively disposed on the side covers. Each of the two side covers is partitioned into an upper space and a lower space by the side bar. The first integrating member is disposed on the first ends of the side covers and located in the upper spaces of the side covers. The second integrating member is disposed on the second ends of the side covers and located in the upper spaces of the side covers. The light guide plate is held on the carrying portions of the side covers and partially located in the lower spaces of the side covers. The light guide plate has at least one side surface, a first light-emitting surface and a second light-emitting surface, and the first light-emitting surface and the second light-emitting surface are respectively connected to two opposite edges of the side surface, and only side edge portions of the first light-emitting surface and the second light-emitting surface are covered by the frame body. The light source is disposed on the carrying portion of the side cover and disposed adjacent to the side surface of the light guide plate. The circuit assembly is disposed on the frame body and is connected to the light source to form an electrical loop.

According to an embodiment of the present invention, each of the side covers further includes a sidewall and a partition plate, and the sidewall is connected to a side edge of the carrying portion, and the partition plate is disposed on the carrying portion, and an accommodating channel is formed between the sidewall and the partition plate, and the light source is disposed on the partition plate.

According to an embodiment of the present invention, the frame body further includes a first decorative cover covering a side surface of the first integrating member and the accommodating channels. The first decorative cover has at least one first engaging portion engaged in the at least one of the accommodating channels.

According to an embodiment of the present invention, the frame body further includes a second decorative cover covering a side surface of the second integrating member and the accommodating channels. The second decorative cover has at least one second engaging portion engaged in the at least one of the accommodating channels.

According to an embodiment of the present invention, the first integrating member has a first installation space disposed thereon, and the second integrating member has a second installation space disposed thereon. The circuit assembly includes a first connector, a second connector and a bundle of wires. The first connector is disposed in the first installation space. The second connector is disposed in the second installation space. The wires are electrically connected to the first connector and the second connector.

According to an embodiment of the present invention, each of the side covers further includes a sidewall and a partition plate, and the sidewall is connected to a side edge of the carrying portion, and the partition plate is disposed on the carrying portion and there is an accommodating channel formed between the partition plate and the sidewall, the light source is disposed on the partition plate, and the wires are disposed in the accommodating channel of at least one of the side covers.

According to an embodiment of the present invention, the circuit assembly further includes a driver electrically connected to the light source, and the driver is disposed in the first installation space or the second installation space.

According to an embodiment of the present invention, at least one of the side bars has a first through hole and a second through hole respectively communicated with the first installation space and the second installation space. one end of the bundle of wire extends into the first through hole and is connected to the first connector, and the other end of the bundle of wire extends into the second through hole and is connected to the second connector.

According to an embodiment of the present invention, each of the side bars has a folding portion, and the lower space is a space formed between the folding portions and the carrying portions, and the light guide plate is disposed between the folding portions and carrying portions.

According to an embodiment of the present invention, the frame body further includes a first upper cover and a second upper cover, and the first upper cover simultaneously covers the first integrating member and the first ends of the side covers, and the second upper cover simultaneously covers the second integrating member and the second ends of the side covers.

According to an embodiment of the present invention, each of the carrying portions has at least one groove, and the light source is engaged in the groove.

According to the aforementioned object, a lamp system is provided. The lamp system includes the aforementioned lamps and plural supporting bars. Each of the supporting bars is disposed between the side covers of every two adjacent ones of the lamps. The light guide plates of the lamps are continuously connected to each other. The circuit assembly of each of the lamps further includes a driver which is electrically connected to the light source. The first connector of the circuit assembly of an endmost one of the lamps is configured to be connected to an external AC source. The first connector of the circuit assembly of each of the rest of the lamps is connected to the second connector of its adjacent lamp so as to form a connection with the endmost one of the lamps.

According to an embodiment of the present invention, the lamp system further includes plural fixing members, each of the fixing members is inserted through at least one through hole of each of the side covers and to be fixed on the supporting bars.

According to an embodiment of the present invention, a method for assembling a lamp system is provided. The method includes the following steps. Plural aforementioned lamps are provided. Each of the side covers of the lamps has an accommodating channel. The circuit assembly of each of the lamps includes a first connector, a second connector and a bundle of wires. The first connector is disposed in the first integrating member. The second connector is disposed in the second integrating member. The wires are electrically connected to the first connector and the second connector. Thereafter, at least two supporting bars are disposed between the accommodating channels of the side covers of two adjacent lamps. Next, the first connector of one of the lamps is connected to the second connector of another lamp adjacent to the one of the lamps together.

According to an embodiment of the present invention, the frame body of each of the lamps further includes a first decorative cover and a second decorative cover. The first decorative cover covers the side surface of the first integrating member and the accommodating channels, and the second decorative cover covers the side surface of the second integrating member and the accommodating channels. Before the step of disposing the supporting bars between the accommodating channels of the side covers of two adjacent lamps, the method further includes removing the first decorative covers and the second decorative covers from the lamps.

According to an embodiment of the present invention, after the step of connecting the lamps together, the method further includes inserting a plurality of fixing members through the side covers so as to fix the supporting bars.

According to the aforementioned embodiments of the present invention, the present invention uses the frame body to integrate the circuit assembly, the light source and the light guide plate together, thereby forming a lamp with a simple structure and a quick assembly function. In addition, the frame body of the present invention does not cover the main light-emitting surface of the light guide plate. Therefore, when plural lamps are connected in series to form a lamp system, the light guide plates of the lamps can be jointed to form a continuous structure, thereby improving the appearance of the lamp system.

BRIEF DESCRIPTION OF THE DRAWINGS

The invention can be more fully understood by reading the following detailed description of the embodiment, with reference made to the accompanying drawings as follows.

DETAILED DESCRIPTION

Spatially relative terms used in the present disclosure, such as "upper," "beneath," "lower," "X-direction," "Y-direction," and the like, may be used herein for ease of description to describe one element or feature's relationship to another element(s) or feature(s) as illustrated in the figures.

Figure 1:
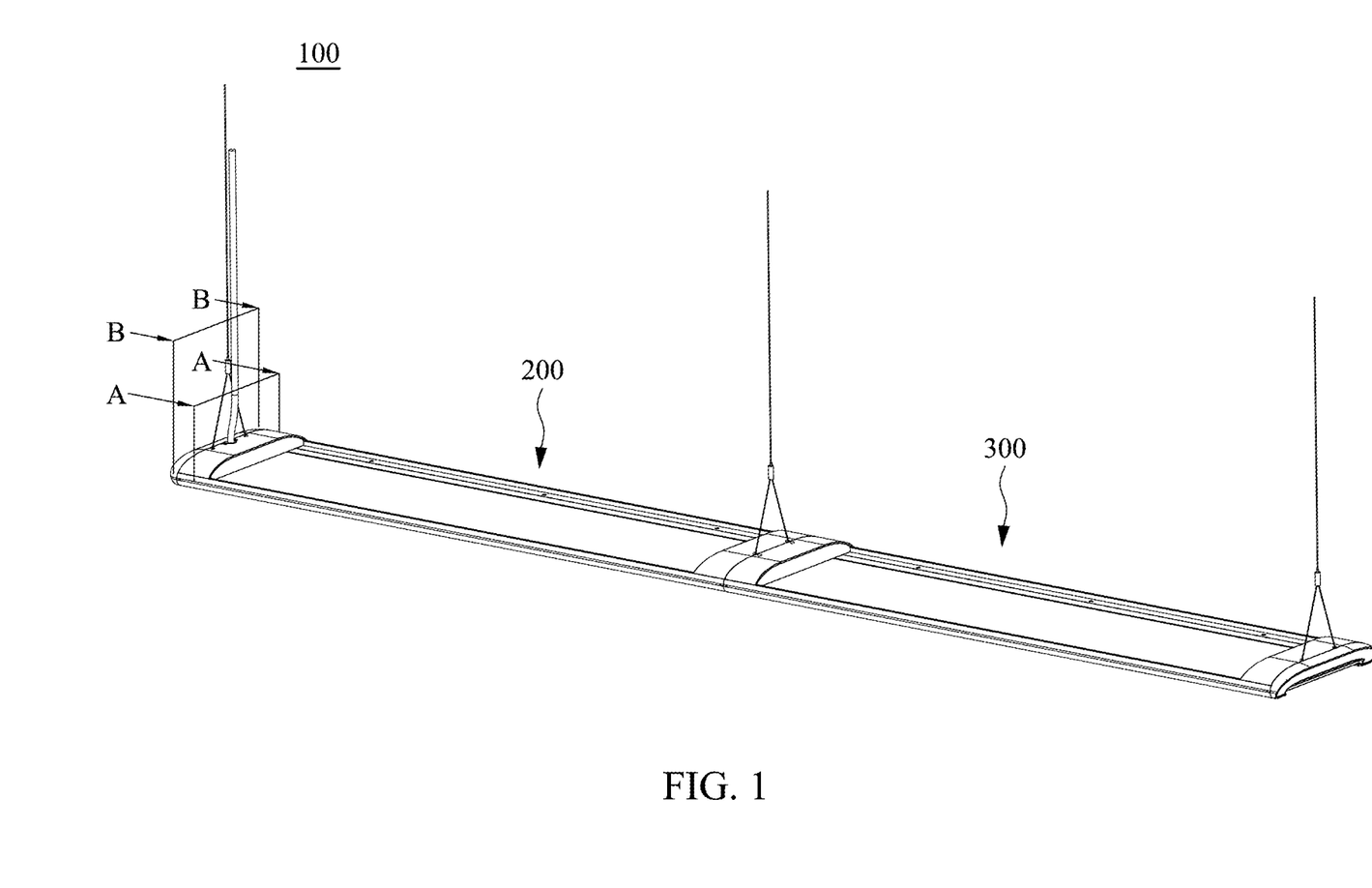
FIG. 1 is a schematic structural diagram showing a lamp system in accordance with an embodiment of the present invention.
Figure 2:
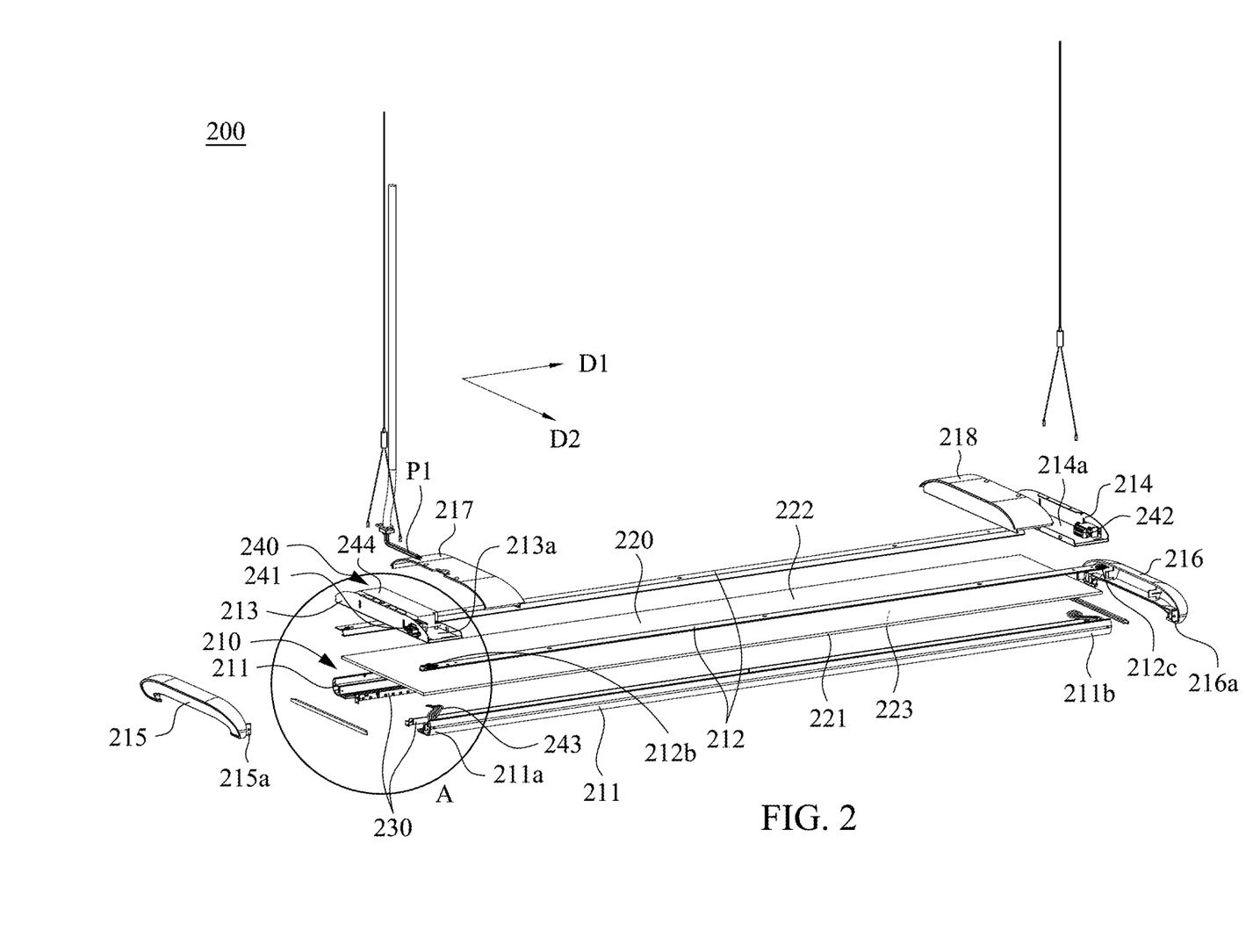
FIG. 2 is a schematic exploded view of a lamp in accordance with an embodiment of the present invention.

Simultaneously referring to FIG. 1 and FIG. 2, FIG. 1 is a schematic structural diagram showing a lamp system 100 in accordance with an embodiment of the present invention, and FIG. 2 is a schematic exploded view of a lamp 200 in accordance with an embodiment of the present invention. The lamp system 100 of the present embodiment is mainly constituted by at least two lamps (such as the lamp 200 and a lamp 300) connected in series. The lamp 200 mainly includes a frame body 210, a light guide plate 220, at least one light source 230, and a circuit assembly 240. The frame body 210 includes two opposite side covers 211, two opposite side bars 212, a first integrating member 213, a second integrating member 214, a first decorative cover 215, a second decorative cover 216, a first upper cover 22217 and a second upper cover 218.

Figure 3:
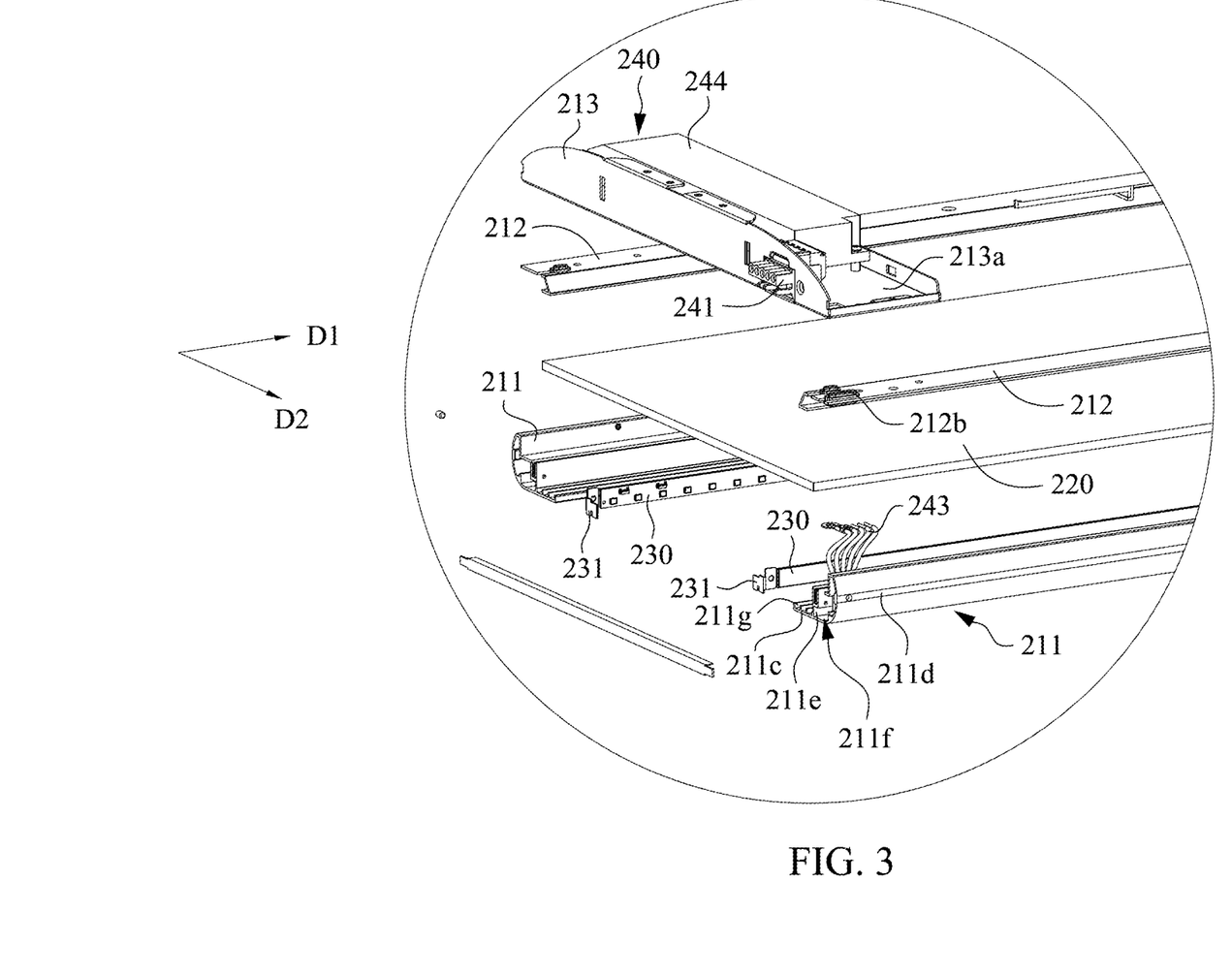
FIG. 3 is a schematic diagram showing an enlarged portion labeled with detail "A" in FIG. 2.

Simultaneously referring to FIG. 2 and FIG. 3, FIG. 3 is a schematic diagram showing an enlarged portion labeled with detail "A" in FIG. 2. In one embodiment, each of the side covers 211 extends along a first direction D1 (i.e. X-direction), and each of the side covers 211 has a first end 211*a* and a second end 211*b* opposite to the first end 211*a*. Each of the side covers 211 includes a carrying portion 211*c*, a sidewall 211*d* and a partition plate 211*e*. The sidewall 211*d* is connected to a side edge of the carrying portion 211*c*, and the partition plate 211*e* is vertically disposed on the carrying portion 211*c* so as to form an accommodating channel 211*f* between the partition plate 211*e* and the sidewall 211*d*. The light source 230 is disposed on the partition plate 211*e*, and is engaged in a groove 211*g* of the carrying portion 211*c*. In one embodiment, the light source 230 is an LED light bar, and the LED light bar has two clamping plates 231 disposed on two opposite ends of the LED light bar, and the clamping plates 231 are fixed on the groove 211g of the carrying portion 211c.

Figure 4:
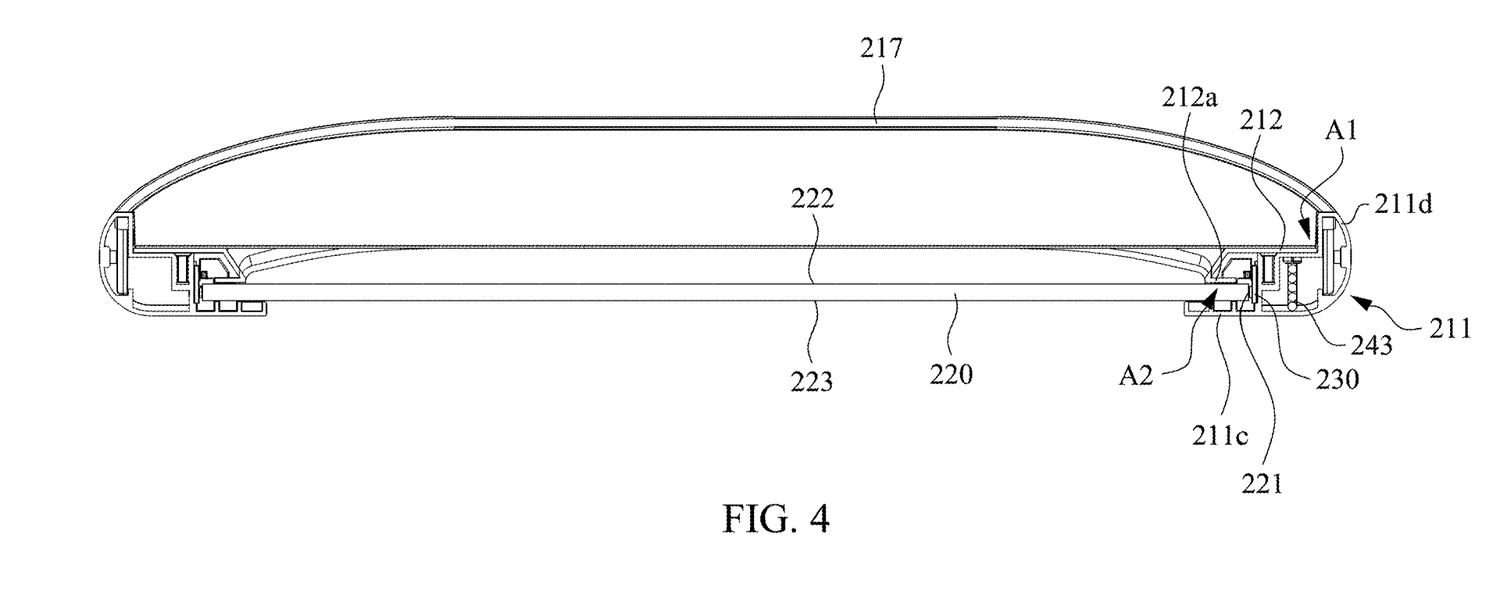
FIG. 4 is a schematic cross-sectional view taken along line A-A in FIG. 1.

Simultaneously referring to FIG. 2 to FIG. 4, FIG. 4 is a schematic cross-sectional view taken along line A-A in FIG. 1. The side bars 212 extend along the first direction D1. The side bars 212 are fixed on the side covers 211 respectively, and each of the two side covers 211 is partitioned into an upper space A1 and a lower space A2 by its corresponding side bar 212. More specifically, the upper space A1 is defined as a space surrounded by a top surface of the side bar 212 and the sidewall 211d of the side cover 211, and the lower space A2 is defined as a space surrounded by a bottom surface of the side bar 212 and carrying portion 211c of the side cover 211. In some embodiments, each of the side bars 212 has a folding portion 212a, and the lower space A2 is defined as a space surrounded by the folding portion 212a of the side bar 212 and the carrying portion 211c of the side cover 211.

Referring to FIG. 2 to FIG. 4 again, the light guide plate 220 is disposed in the lower space A2 and is located between the folding portion 212a and the carrying portion 211c. The light guide plate 220 has at least one side surface 221, a first light-emitting surface 222 and a second light-emitting surface 223, in which the first light-emitting surface 222 and the second light-emitting surface 223 are respectively connected to two opposite sides of the side surface 221, and the first light-emitting surface 222 and the second light-emitting surface 223 are respectively faced upwardly and downwardly. In the present embodiment, a portion of the light guide plate 220 near the side surface 221 is located between the folding portion 212a of the side bar 212 and the carrying portion 211c of the side cover 211. Moreover, the side surface 221 is a light-incident surface which is disposed adjacent to the light source 230 located on the carrying portion 211c. In other words, only portions of the first light-emitting surface 222 and the second light-emitting surface 223 of the light guide plate 220 near side surface 221 are located between the side bar 212 and the side cover 211 (i.e. only the portions of the first light-emitting surface 222 and the second light-emitting surface 223 near side edge are covered by the frame body 210, and no component blocks the light emitted from the first light-emitting surface 222 faced upwardly).

Figure 5:
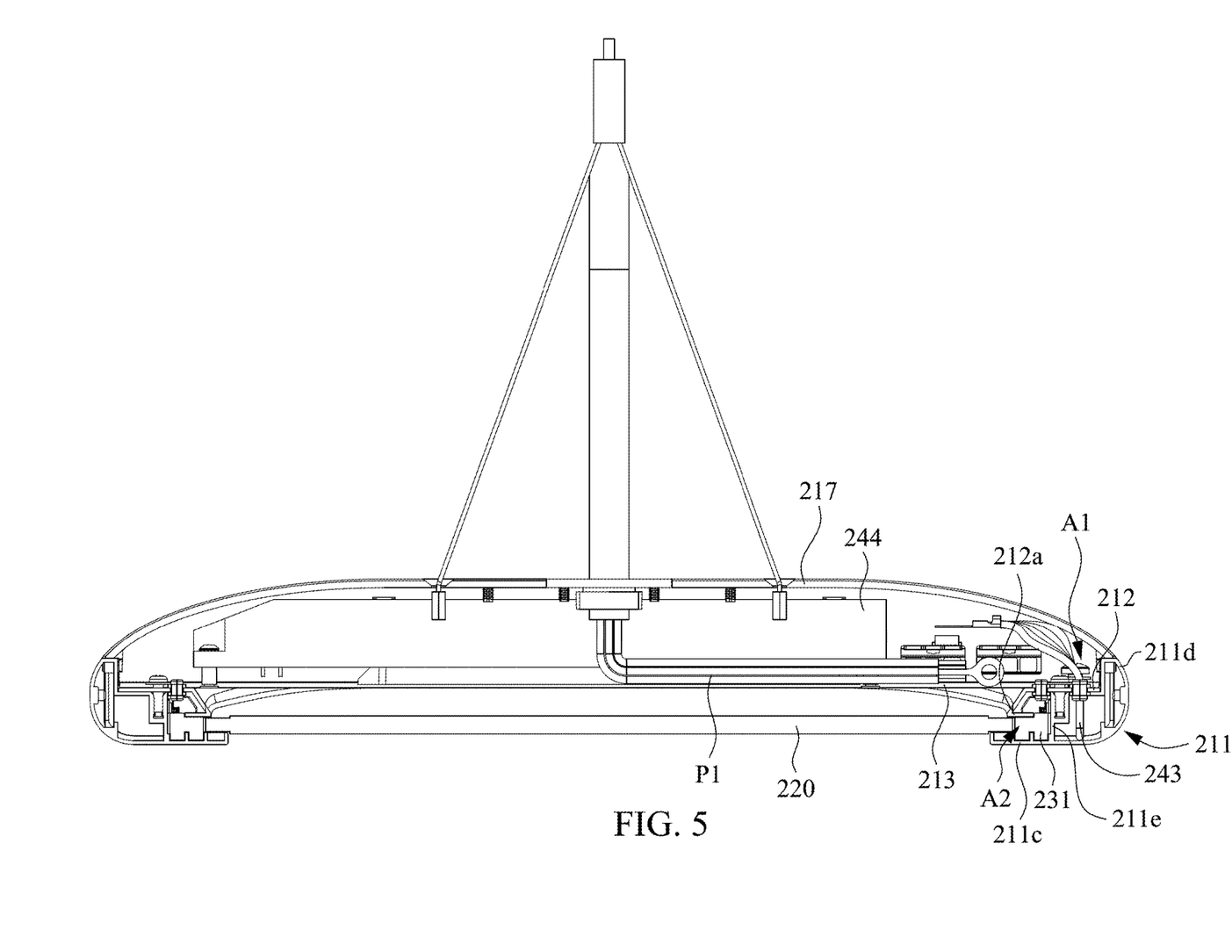
FIG. 5 is a schematic cross-sectional view taken along line B-B in FIG. 1.

Simultaneously referring to FIG. 2, FIG. 3 and FIG. 5, FIG. 5 is a schematic cross-sectional view taken along line B-B in FIG. 1. In the present embodiment, the first integrating member 213 and the second integrating member 214 are end caps. The first integrating member 213 and the second integrating member 214 extend along a second direction D2 (i.e. Y-direction). The first integrating member 213 is disposed on the upper space A1 of the side cover 211 and is connected to the first ends 211a of the side covers 211. The second integrating member 214 is disposed on the upper space A1 of the side cover 211 and is connected to the second ends 211b of the side cover 211. In one embodiment, as shown in FIG. 2, the first integrating member 213 has a first installation space 213a, and the second integrating member 214 has a second installation space 214a. The first installation space 213a and the second installation space 214a are configured to accommodate some components of the circuit assembly 240.

In the present embodiment, the circuit assembly 240 is disposed on the frame body 210 and is connected to the light source 230 to form an electrical loop. In one embodiment, the circuit assembly 240 includes a first connector 241, a second connector 242, a bundle of wires 243 and a driver 244. The first connector 241 and the driver 244 are disposed in the first installation space 213a of the first integrating member 213, and the second connector 242 is disposed in the second installation space 214a of the second integrating member 214. The wires 243 are disposed in the accommodating channel 211f of one of the side cover 211, in which one end of the bundle of wires 243 extends into a first through hole 212b of the side bar 212 to be connected to the first connector 241, and the other end of the bundle of wires 243 extends into a second through hole 212c of the side bar 212 to be connected to the second connector 242. The driver 244 is used to convert the alternating current (AC) to direct current (DC) which can be used by the light source 230.

Figure 6A:
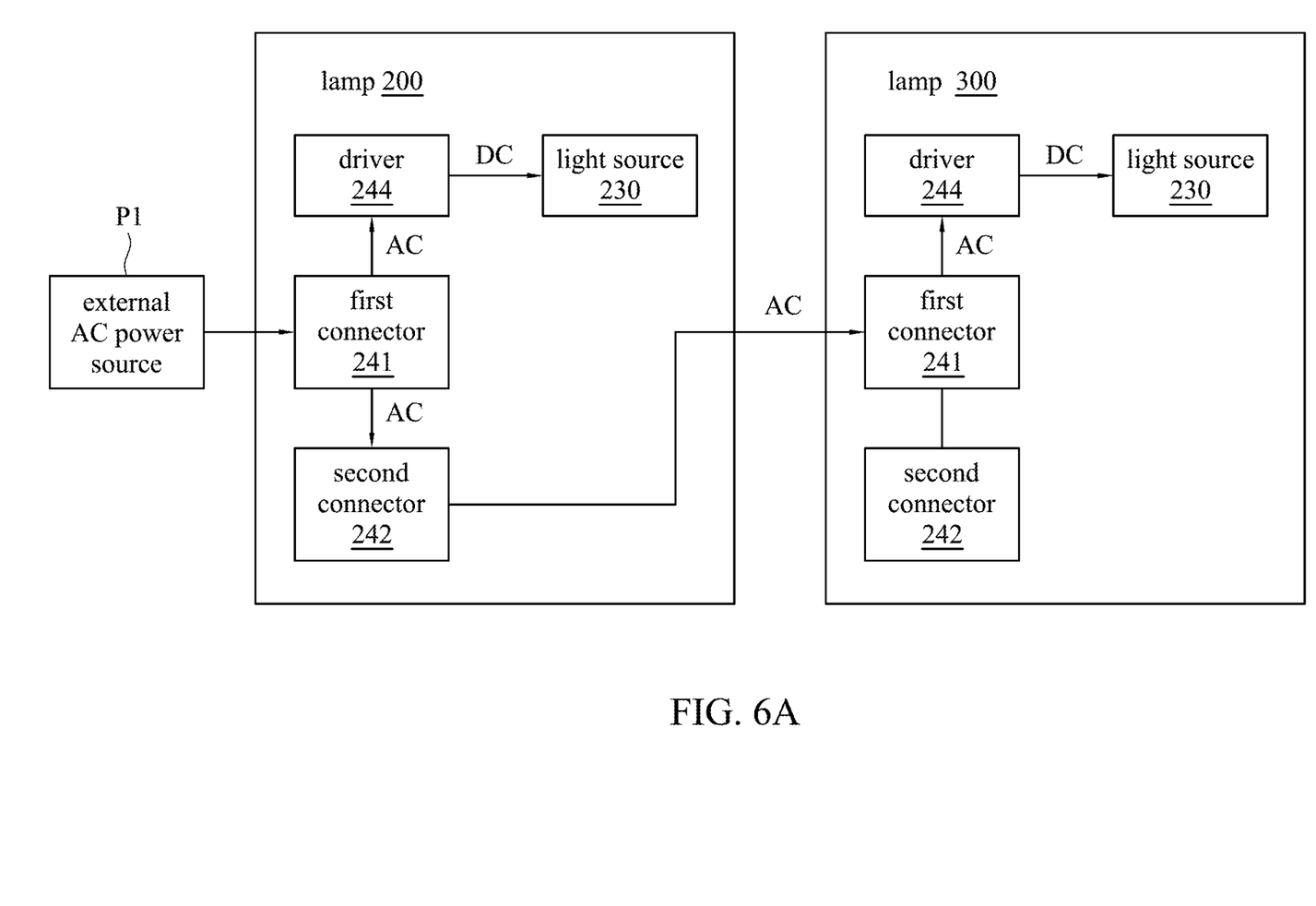
FIG. 6A is a block diagram showing lamps in a series-connection state in accordance with an embodiment of the present invention.
Figure 6B:
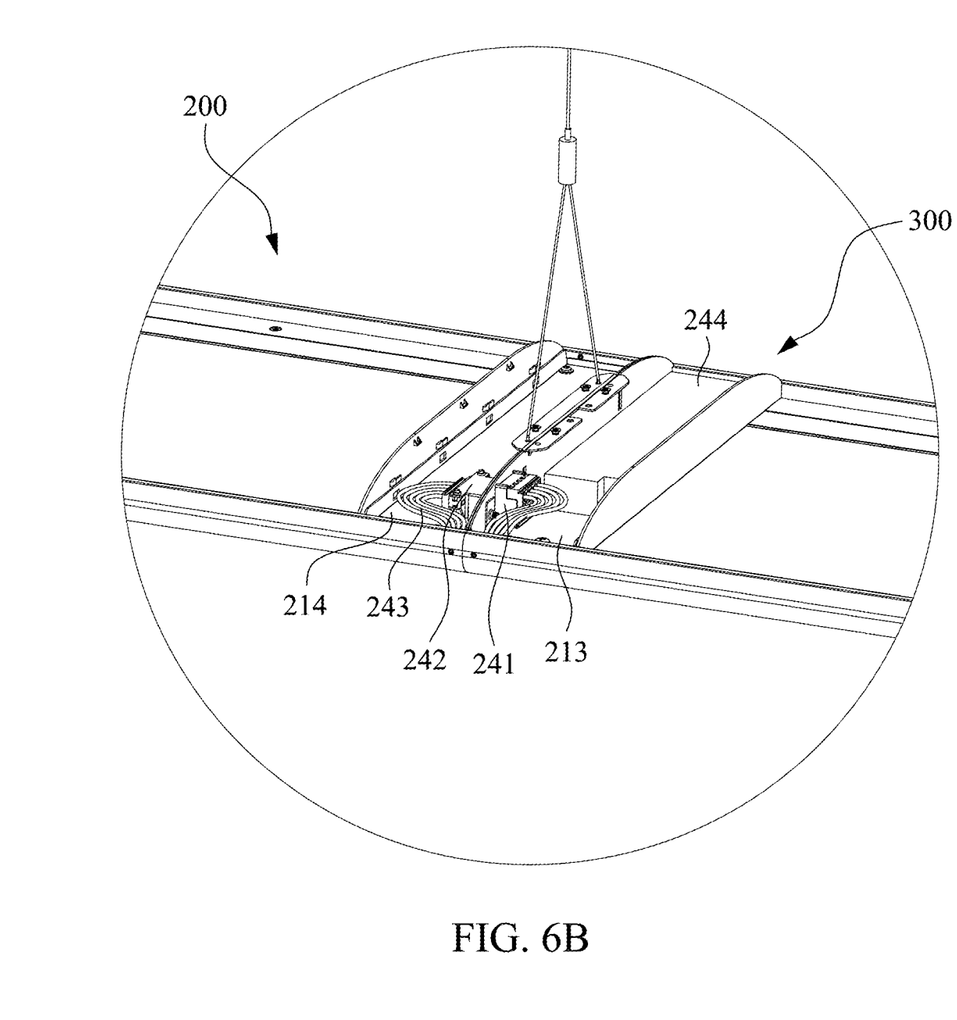
FIG. 6B is a schematic structural diagram showing the lamps in the series-connection state in accordance with an embodiment of the present invention.

Simultaneously referring to FIG. 2, FIG. 6A and FIG. 6B, FIG. 6A and FIG. 6B are a block diagram and a schematic structural diagram showing the lamps 200 and 300 in a series-connection state in accordance with an embodiment of the present invention. It is noted that, the lamp 200 and the lamp 300 have substantially the same structures, and the same reference numbers used in the drawings and the description are referred to the same or like parts. In the present embodiment, the lamp 200 is the first lamp (i.e. the lamp nearest a power source). When the lamp 200 and the lamp 300 are connected together, the second connector 242 of the lamp 200 is connected to the first connector 241 of the lamp 300, and the first connector 241 of the lamp 200 is connected to an external AC power source P1. The alternating current provided by the external AC power source P1 is distributed to the driver 244 of the lamp 200 and the second connector 242 of the lamp 200 through the first connector 241 of the lamp 200. Therefore, the alternating current transmitted to the driver 244 of the lamp 200 is converted to direct current which can be used by the light source 230 of the lamp 200. In addition, the alternating current transmitted to the second connector 242 of the lamp 200 is further transmitted to the lamp 300, thereby forming an electrical loop between the lamp 200 and the lamp 300. Similarly, the alternating current transmitted from the lamp 200 is distributed to the driver 244 of the lamp 300 by the first connector 241 of the lamp 300, and the driver 244 of the lamp 300 further converts the alternating current to direct current which can be used by the light source 230 of the lamp 300. In other embodiments, if there is another lamp connected to the lamp 300, the alternating current transmitted to the first connector 241 of the lamp 300 is further transmitted to the second connector 242 of the lamp 300 by the wire 243, so as to be transmitted to the another lamp.

In some embodiments, the first connector 241 of the lamp 200 is a 3-WAY quick terminal connector (as shown in FIG. 5) which is disposed inside the lamp 200 without being exposed to outside. A wire of the external AC power source P1 extends into the lamp 200, and the alternating current is distributed from the first connector 240 to the driver 244 of the lamp 200 and the second connector 242 of the lamp 200 by using the 3-WAY quick terminal connector. On the other hand, the first connector 241 of the lamp 300 is a connector splitter, and a joint portion of the connector splitter is exposed externally so as to be easily coupled to a joint portion of the second connector 242 of the lamp 200, such that the alternating current can be transmitted from the lamp 200 to the lamp 300.

Referring to FIG. 2 again, the first decorative cover 215 is used to cover a side surface of the first integrating member 213 and the accommodating channels 211f, and the first decorative cover 215 has a first engaging portion 215a engaged in the accommodating channels 211f. The second decorative cover 216 is used to cover a side surface of the second integrating member 214 and the accommodating channels 211f, and the second decorative cover 216 has a second engaging portion 216a engaged in the accommodating channels 211f. In addition, the first upper cover 22217 covers the first integrating member 213 and the first ends 211a of the side covers 211, the second upper cover 218 covers the second integrating member 214 and the second end 211b of the side covers 211.

Figure 7:
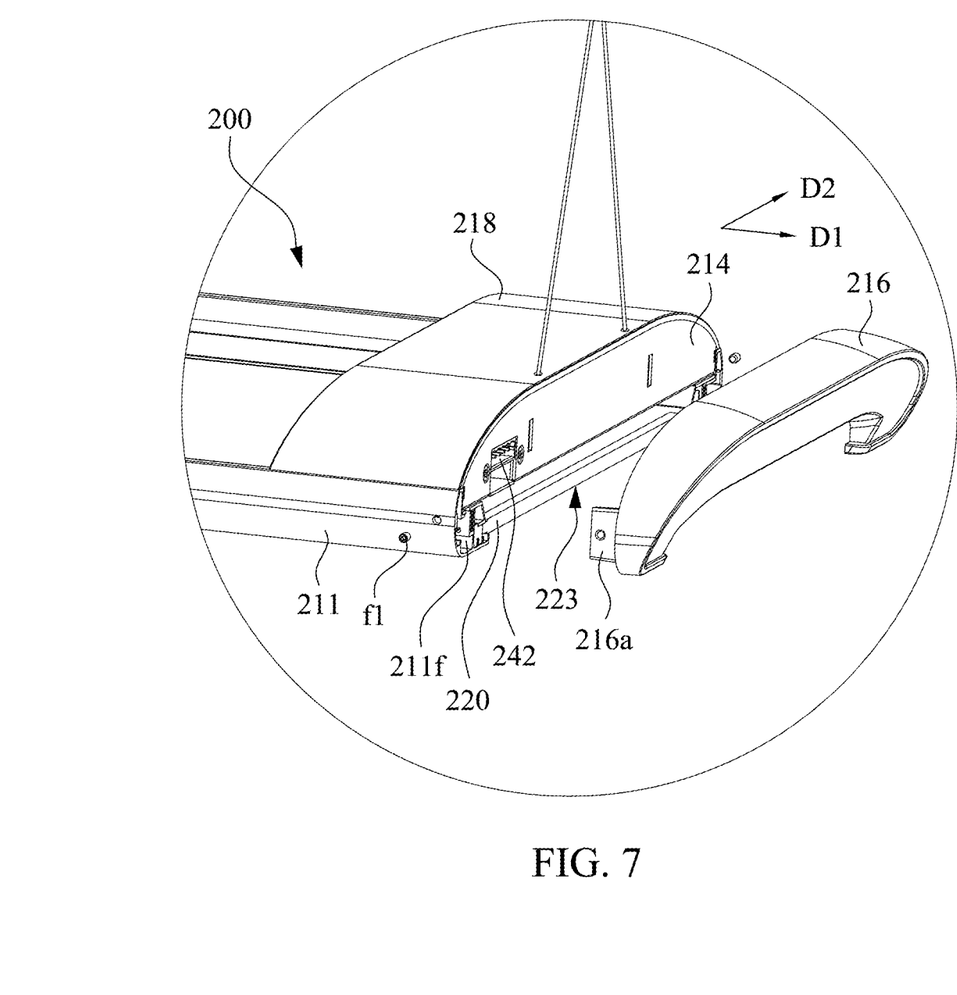
FIG. 7 is a schematic structural diagram showing a second decorative cover removed from a lamp in accordance with an embodiment of the present invention.
Figure 8:
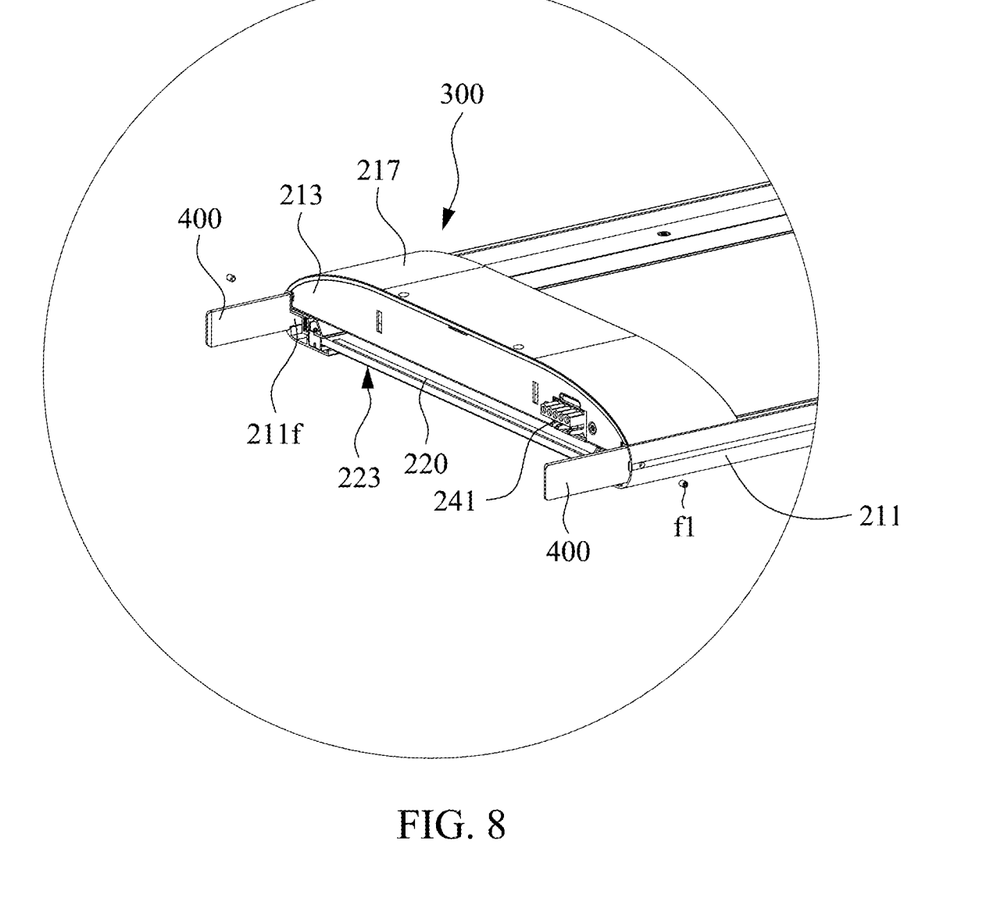
FIG. 8 is a schematic structural diagram showing supporting bars disposed in accommodating channel of a lamp.

Based on the above, the present invention further provides a method for assembling lamp system. Referring to FIG. 2, FIG. 7, and FIG. 8, FIG. 7 is a schematic structural diagram showing the second decorative cover 216 removed from the lamp 200 in accordance with an embodiment of the present invention, and FIG. 8 is a schematic structural diagram showing supporting bars 400 disposed in the accommodating channels 211f of the lamp 300. The method mainly includes the following steps. At first, at least two aforementioned lamps, such as the lamp 200 and the lamp 300, are provided. Thereafter, as shown in FIG. 7, the second decorative cover 216 of the lamp 200 is removed, and the first decorative cover 215 of the lamp 300 is removed. Then, as shown in FIG. 8, at least two supporting bars 400 are respectively disposed between the accommodating channels 211f of the side covers 211 of the lamp 200 as well as between the accommodating channels 211f of the side covers 211 of the lamp 300. More specifically, one portion of each of the supporting bars 400 is inserted in the accommodating channel 211f of the side cover 211 of the lamp 200, and the other portion of each of the supporting bars 400 is inserted in the accommodating channel 211f of the side cover 211 of the lamp 300, thereby increasing an engagement stability between the lamp 200 and the lamp 300. In some examples, plural fixing members f1 can be inserted into the side covers 211 to fix the supporting bars 400. Thereafter, as shown in FIG. 6B, the couple mechanism of one end cap (i.e. the first connector 241) of the lamp 300 is coupled to another couple mechanism of the end cap (i.e. the second connector 242) of the lamp 200, thereby connecting the lamp 200 and the lamp 300 together to form the lamp system 100 as shown in FIG. 1.

Since the present invention uses an AC power source as a power supply, only one single wire of the external AC power source P1 extending from the ceiling is used to connect the endmost one of the lamps in the lamp system regardless of the number of the lamps, and no external wires are needed for the rest of the lamps for connecting to the external AC source, thereby simplifying the structure of the lamp system, as shown in FIG. 1.

In addition, in other embodiments, a steel suspension cable having a conductive strand and a plurality of strength strands wound around the conductive strand can be used to replace the wire of the external AC power extending from the ceiling for transmitting external alternating current to the lamps, thereby simplifying the overall design of the lamp system.

It is noted that, as shown in FIG. 7 and FIG. 8, the first integrating member 213 and the second integrating member 214 are located on an upper side of the side covers 211, and the light guide plate 220 is located on a lower side of the side covers 211. When the first decorative cover 215 and the second decorative cover 216 are removed, two opposite side surfaces extending along the second direction D2 of the light guide plate 220 are respectively align with the side surface of the first integrating member 213 and the side surface of the second integrating member 214. Therefore, when the lamp 200 and the lamp 300 are connected together, the light guide plate 220 of the lamp 200 and the light guide plate 220 of the lamp 300 can directly contact each other. More specifically, the second light-emitting surface 223 of the light guide plate 220 of the lamp 200 and the second light-emitting surface 223 of the light guide plate 220 of the lamp 300 are formed in a continuous surface, thus having better appearance and less or no dark areas.

Figure 9:
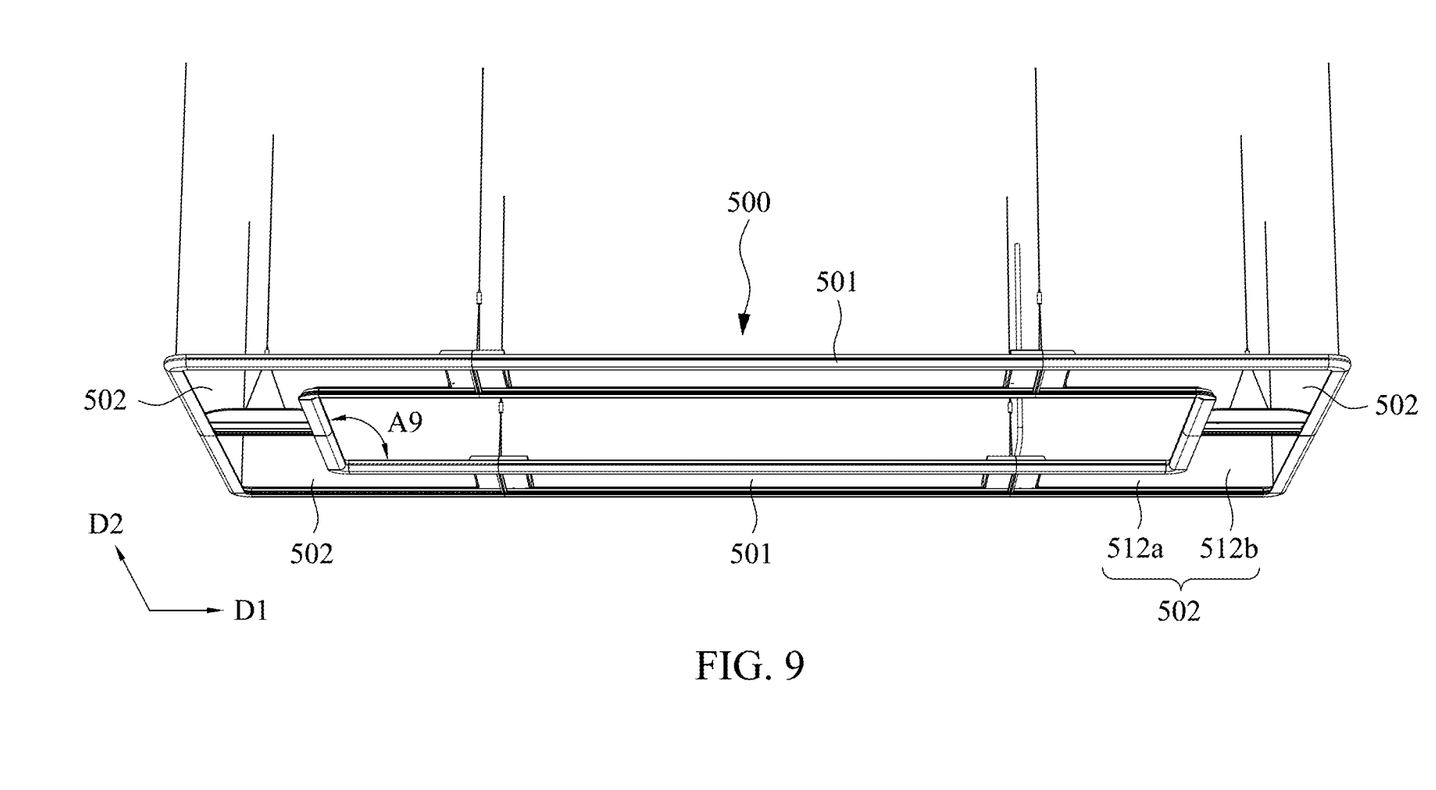
FIG. 9 is a schematic structural diagram showing another lamp system in accordance with an embodiment of the present invention.

In some embodiments, the shape of the lamp is not limited to a rectangle. Referring to FIG. 9, FIG. 9 is a schematic structural diagram showing another lamp system 500 in accordance with an embodiment of the present invention. In the present embodiment, the lamp system 500 is formed from connecting two rectangular lamps 501 and four L-shaped lamps 502 together, and the light-emitting surfaces of the rectangular lamps 501 and the L-shaped lamps 502 are connected to form a continuous surface.

Each of the L-shaped lamps 502 can be divided into at least two illuminating segments 512a and 512b respectively extend in different directions, e.g., a first direction D1 (i.e. X-direction) and a second direction D2 (i.e. Y-direction), where the first direction D1 is perpendicular to the second direction D2. Specifically, the illuminating segment 512a extends in the first direction D1, and the illuminating segment 512b extends in the first direction D2. An included angle A9 is formed between the illuminating segments 512a and 512b of the same L-shaped lamp 502.

According to the aforementioned embodiments of the present invention, the present invention uses the frame body to integrate the circuit assembly, the light source and the light guide plate together, thereby forming a lamp with a simple structure and a quick assembly function. In addition, the frame body of the present invention does not cover the main light-emitting surface of the light guide plate. Therefore, when plural lamps are connected in series to form a lamp system, the light guide plates of the lamps can be jointed to form a continuous structure, thereby improving the appearance of the lamp system.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A lamp, comprising:
a frame body, comprising two side covers disposed opposite to each other, a plurality of supporting bars, and two end caps, wherein each of the end caps has a couple mechanism;
a light guide plate held on the side covers, wherein the light guide plate has at least one incident surface, two opposite edges respectively connected to two ends of the incident surface, a first light-emitting surface, and a second light-emitting surface, wherein the first light-emitting surface and the second light-emitting surface are respectively connected to the two opposite edges, the two end caps are located above the first light-emitting surface and adjacent to the two opposite edges respectively, and only side edge portions of the first light-emitting surface and the second light-emitting surface are covered by the frame body; and at least one light source disposed adjacent to the incident surface of the light guide plate;

wherein the couple mechanism of one end cap of the frame body is connected to an external AC source so that the alternating current from the external AC source is inputted, distributed to a driver, and further outputted the alternating current in one of the side covers to the couple mechanism of the other end cap of the frame body via at least one wire disposed in an accommodating channel of one of the side covers as long as each of the supporting bars is disposed between the accommodating channels of the side covers of every two adjacent ones of the lamps;

wherein the driver is used to convert the alternating current to the direct current which can be used by the light source.

2. The lamp of claim 1, wherein the lamp is divided into at least two illuminating segments respectively extending in different directions, and an included angle is formed between the at least two illuminating segments.

3. The lamp of claim 2, wherein the at least two illuminating segments respectively extend in a first direction and a second direction, and the first direction is perpendicular to the second direction.

4. The lamp of claim 1, wherein the wire is disposed in the accommodating channel of the one of the side covers after removing a decorative cover used to cover the couple mechanism of the end cap and the accommodating channels of the side covers.

5. A hanging transparent lamp, which is suspended by a suspension member, wherein the hanging transparent lamp comprises:

a frame body, comprising two side covers disposed opposite to each other, a plurality of supporting bars, and two end caps, wherein each of the end caps has a couple mechanism;

a light guide plate held on the side covers, wherein the light guide plate has at least one incident surface, two opposite edges respectively connected to two ends of the incident surface, a first light-emitting surface, and a second light-emitting surface, wherein the first light-emitting surface and the second light-emitting surface are respectively connected to the two opposite edges, the two end caps are located above the first light-emitting surface and adjacent to the two opposite edges respectively, and only side edge portions of the first light-emitting surface and the second light-emitting surface are covered by the frame body; and at least one light source disposed adjacent to the incident surface of the light guide plate;

wherein the suspension member is suspended above the first light-emitting surface;

wherein the couple mechanism of one end cap of the frame body is connected to an external AC source so that the alternating current from the external AC source is inputted, distributed to a driver, and further outputted the alternating current in one of the side covers to the couple mechanism of the other end cap of the frame body via at least one wire disposed in an accommodating channel of one of the side covers as long as each of the supporting bars is disposed between the accommodating channels of the side covers of every two adjacent ones of the lamps;

wherein the driver is used to convert the alternating current to the direct current which can be used by the light source.

6. The hanging transparent lamp of claim 5, wherein the hanging transparent lamp is divided into at least two illuminating segments respectively extending in different directions, and an included angle is formed between the at least two illuminating segments.

7. The hanging transparent lamp of claim 6, wherein the at least two illuminating segments respectively extend in a first direction and a second direction, and the first direction is perpendicular to the second direction.

8. The hanging transparent lamp of claim 5, wherein the wire is disposed in the accommodating channel of the one of the side covers after removing a decorative cover used to cover the couple mechanism of the end cap and the accommodating channels of the side covers.

9. A lamp system, comprising:

a plurality of lamps, wherein each of the lamps comprises:

a frame body, comprising two side covers disposed opposite to each other, a plurality of supporting bars, and two end caps, wherein each of the end caps has a couple mechanism;

a light guide plate held on the side covers, wherein the light guide plate has at least one incident surface, two opposite edges respectively connected to two ends of the incident surface, a first light-emitting surface, and a second light-emitting surface, wherein the first light-emitting surface and the second light-emitting surface are respectively connected to the two opposite edges, the two end caps are located above the first light-emitting surface and adjacent to the two opposite edges respectively, and only side edge portions of the first light-emitting surface and the second light-emitting surface are covered by the frame body; and at least one light source disposed adjacent to the incident surface of the light guide plate;

wherein the light guide plates of the lamps are connected in series to form a continuous light emitting surface;

wherein the couple mechanism of one end cap of the frame body is connected to an external AC source so that the alternating current from the external AC source is inputted, distributed to a driver, and further outputted the alternating current in one of the side covers to the couple mechanism of the other end cap of the frame body via at least one wire disposed in an accommodating channel of one of the side covers as long as the plurality of supporting bars are disposed between the accommodating channels of the side covers of two adjacent lamps;

wherein the driver is used to convert the alternating current to the direct current which can be used by the light source.

10. The lamp system of claim 9, wherein the continuous light emitting surface formed by serially connecting the lamps is a closed loop surface.

11. The lamp system of claim 10, wherein each of the lamps further comprises at least one corner lamp which forms a turning area of the continuous light emitting surface, wherein the corner lamp is divided into at least two illuminating segments respectively extend in different directions, wherein an included angle is formed between the at least two illuminating segments.

12. The lamp system of claim 11, wherein the at least two illuminating segments respectively extend in a first direction and a second direction, and the first direction is perpendicular to the second direction.

13. The lamp system of claim 9, wherein the wire is disposed in the accommodating channel of the one of the side covers after removing a decorative cover used to cover the couple mechanism of the end cap and the accommodating channels of the side covers.

* * * * *